United States Patent
Prescott et al.

(10) Patent No.: US 9,242,627 B2
(45) Date of Patent: Jan. 26, 2016

(54) VALVE ASSEMBLY

(75) Inventors: Robert David Prescott, Solihull (GB); Laurence John Potter, Birmingham (GB); Edward Gilbert Shaw, Worcester (GB)

(73) Assignee: HALDEX BRAKE LIMITED (GB)

( * ) Notice: Subject to any disclaimer, the term of this patent is extended or adjusted under 35 U.S.C. 154(b) by 241 days.

(21) Appl. No.: 13/701,254

(22) PCT Filed: Jun. 1, 2011

(86) PCT No.: PCT/GB2011/051033
§ 371 (c)(1),
(2), (4) Date: Feb. 8, 2013

(87) PCT Pub. No.: WO2011/151645
PCT Pub. Date: Dec. 8, 2011

(65) Prior Publication Data
US 2013/0263953 A1    Oct. 10, 2013

(30) Foreign Application Priority Data

Jun. 2, 2010 (GB) .................................. 1009242.7

(51) Int. Cl.
*F16K 11/07* (2006.01)
*B60T 15/02* (2006.01)
(Continued)

(52) U.S. Cl.
CPC ................. *B60T 15/02* (2013.01); *B60T 8/327* (2013.01); *B60T 8/361* (2013.01); *B60T 15/027* (2013.01);
(Continued)

(58) Field of Classification Search
CPC ......... B60T 15/02; B60T 15/18; B60T 8/361; B60T 15/027; B60T 8/327; F16K 31/423; F16K 11/044; Y10T 137/86831
USPC .......... 137/596, 596.18, 625.66, 596.1, 596.2
See application file for complete search history.

(56) References Cited

U.S. PATENT DOCUMENTS 2,634,751 A * 4/1953 Borer ........................ 137/625.66
3,219,396 A * 11/1965 Bueler ............................ 303/52
(Continued)

FOREIGN PATENT DOCUMENTS

DE    1650571 A1    11/1970
EP    1255044 A1    11/2002
(Continued)

OTHER PUBLICATIONS

International Search Report of PCT/GB2011/051033; Issued Aug. 22, 2011.
(Continued)

*Primary Examiner* — Marina Tietjen
*Assistant Examiner* — Umashankar Venkatesan
(74) *Attorney, Agent, or Firm* — Young Basile Hanlon & MacFarlane P.C.

(57) ABSTRACT

A valve assembly (110) having a housing (124) into which are provided a first port (112), a second port (114) and a third port (116), and in which are located a first movable member (126), a second movable member (132) and a third movable member (152), the first movable member (126) being movable between a first position which causes the second movable member (132) to close the first port (112) to prevent any substantial flow of fluid through the first port (112), whilst the second (114) and third (116) ports remain open, a second position which causes the third movable member (152) to close the third port (116) to prevent any substantial flow of fluid through the third port (116), whilst the first (112) and second (114) ports remain open and flow of fluid between the first (112) and the second (114) part is permitted, and a third position which causes the second movable member (132) to close the first port (112) and the third movable member (152) to close the third port (116) to prevent any substantial flow of fluid through either the first port (112) or the third port (116), wherein the second movable member (132) and the third movable member (152) are separate such that relative movement between the second movable member (132) and the third movable member (152) is permitted.

17 Claims, 8 Drawing Sheets

(51) Int. Cl.
- *B60T 8/32* (2006.01)
- *B60T 8/36* (2006.01)
- *B60T 15/18* (2006.01)
- *F16K 11/044* (2006.01)
- *F16K 31/42* (2006.01)

(52) U.S. Cl.
CPC .............. *B60T 15/18* (2013.01); *F16K 11/044* (2013.01); *F16K 31/423* (2013.01); *Y10T 137/86831* (2015.04)

(56) References Cited

U.S. PATENT DOCUMENTS

| | | | | |
|---|---|---|---|---|
| 3,419,315 | A | * | 12/1968 | Bueler ............................. 303/71 |
| 3,548,879 | A | * | 12/1970 | Wilde ........................ 137/637.1 |
| 3,608,587 | A | * | 9/1971 | Zbell ........................ 137/625.66 |
| 4,193,423 | A | * | 3/1980 | Stoll et al. ................ 137/625.64 |
| 5,901,749 | A | * | 5/1999 | Watson .................... 137/625.66 |
| 6,116,280 | A | * | 9/2000 | Goodell ...................... 137/627.5 |
| 6,637,462 | B2 | * | 10/2003 | Foster et al. ................ 137/627.5 |
| 7,147,006 | B2 | * | 12/2006 | Shaw et al. ................ 137/627.5 |
| 7,389,795 | B2 | * | 6/2008 | Potter et al. .............. 137/625.64 |
| 7,891,375 | B2 | * | 2/2011 | Decker .................... 137/596.15 |

FOREIGN PATENT DOCUMENTS

| | | |
|---|---|---|
| EP | 1524163 A2 | 4/2005 |
| GB | 2467957 | 8/2010 |
| WO | WO/2011/151645 A1 | 12/2011 |

OTHER PUBLICATIONS

Written Opinion of the International Searching Authority of PCT/GB2011/051033; Issued Aug. 22, 2011.

* cited by examiner

VALVE ASSEMBLY

DESCRIPTION OF INVENTION

The present invention relates to a valve assembly, particularly, but not exclusively, to a valve assembly typically known as a modulator for use in a fluid pressure operated vehicle braking system.

Vehicle braking systems typically include a valve assembly known as a modulator which is connected to a source of pressurised fluid, the modulator being used to amplify the flow of pressurised fluid to and from a fluid pressure operated brake actuator. The modulator has a supply inlet which is connected to the source of pressurised fluid, a delivery port which is connected to the brake actuator and an exhaust outlet which is connected to the atmosphere (or any other low pressure volume), and can adopt a build position in which flow of fluid between the supply inlet and the delivery port is permitted, an exhaust position in which flow of fluid between the delivery outlet and the exhaust outlet is permitted, and a hold position in which flow of fluid between any two of the exhaust inlet, delivery port and exhaust outlet is substantially prevented.

In conventional braking systems, control of the modulator is achieved using a pressurised fluid signal known as the braking demand signal. When there is driver demand for braking, the driver typically operates a foot pedal, and movement of the foot pedal generates a fluid signal which is transmitted to a control inlet of the modulator. Receipt of the braking demand signal causes the modulator to move to the build position, so that the supply of pressurised fluid from the source of pressurised fluid to the brake actuator required to operate the vehicle brake commences. When the fluid pressure in the brake actuator approaches the pressure of the braking demand signal, the modulator moves to the hold or "lapped" position. Finally, when the driver releases the brake pedal, there is no longer demand for braking, the braking demand signal is removed, and the modulator reverts to the exhaust position, so that the pressurised fluid in the brake actuator acting to apply the vehicle brake is exhausted to the atmosphere.

If the vehicle is provided with anti-lock braking, the braking system includes at least one electrically operable valve which can override the braking demand signal. This is controlled using an electronic braking control unit (ECU) in accordance with conventional ABS control algorithms momentarily to release the brake pressure by moving the modulator to the exhaust position, or hold the brake pressure by moving the modulator to the hold position, even if there is braking demand, if wheel lock is detected.

In electronic braking systems, the braking system is provided with electrically operable hold and exhaust valve. Operation of the foot pedal generates an electrical braking demand signal, and this is transmitted to the ECU, which operates the hold valve and exhaust valve to control the modulator to build, hold or release the pressure in the brake actuator as described above. In this case, supply of fluid to the control inlet is also from the supply of pressurised fluid.

Figure 1:
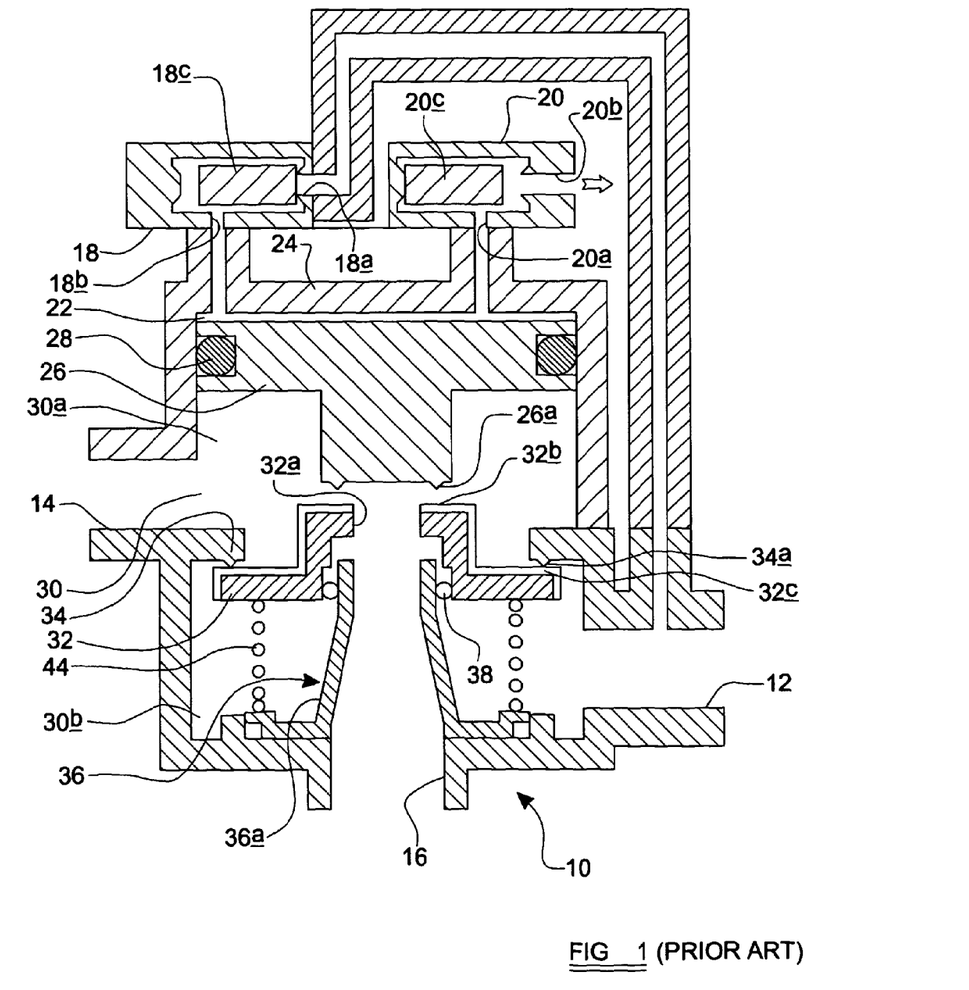
FIG. 1 is a schematic illustration of the prior art modulator described above.

An example of a prior art modulator 10 for use in a vehicle with an electronic braking system is shown in FIG. 1. The modulator 10 has a generally cylindrical housing having a supply inlet 12 which is adapted to be connected to a compressed air reservoir (not shown), a delivery port 14 which is adapted to be connected to a brake actuator (not shown), and an exhaust outlet 16 which in this example vents to atmosphere. It will be appreciated that the exhaust outlet 16 need not vent to atmosphere, and may instead be connected to an alternative low pressure volume which may be elsewhere in the vehicle braking system.

There is also shown a hold valve 18 which has an inlet 18*a* which is connected to the supply inlet 12 of the modulator 10, and an outlet 18*b* which is connected to a control chamber 22 of the modulator 10, and an exhaust valve 20 which has an inlet 20*a* which is connected to the control chamber 22 and an outlet 20*b* which vents to the atmosphere. The hold valve 18 has a valve member 18*c* which is movable from an open position in which flow of fluid between the supply inlet 12 and the control chamber 22 is permitted, and a closed position in which flow of fluid between the control chamber 22 and the supply inlet 12 is substantially prevented. Similarly, the exhaust valve 20 has a valve member 20*c* which is movable between an open position in which venting of fluid from the control chamber 22 to the atmosphere is permitted, and a closed position in which flow of fluid from the control chamber 22 to atmosphere is substantially prevented. Typically each of the valve members 18*c*, 20*c* is moved between the open and closed positions using electrical actuation means such as a solenoid or a piezoelectric element.

The control chamber 22 is located in the space between the modulator housing 24 and a first piston 26, hereinafter referred to as the control piston 26, which is movable within the housing 24 to vary the volume of the control chamber 22. A generally circular seal, which in this example is an O-ring 28 is provided in a circumferential groove around the control piston 26, and engages with the housing 24 to provide a substantially fluid tight seal between the housing 24 and the piston 26.

The space within the housing 24 on the opposite side of the control piston 26 to the control chamber 22 is hereinafter referred to as the main chamber 30.

The supply inlet 12, delivery port 14 and exhaust outlet 16 each comprise an aperture in the housing 24 which is located on the opposite side of the first piston 26 to the control chamber 22, so that each enter the main chamber 30 of the modulator. A gate 32, hereinafter referred to as the main gate 32, is provided in the main chamber 30.

The main gate 32 is provided with a central aperture 32*a* which extends through the main gate 32 from the side of the gate 32 adjacent the control piston 26 to the other. The area around this central aperture 32*a* provides a valve seat 32*b*, hereinafter referred to as the exhaust seat 32*b*. The face of the control piston 26 which forms an edge of the main chamber 30 is provided with a generally circular ridge 26*a* which has a larger diameter than the central aperture 32*a* in the main gate 32. The control piston 26 is movable in the housing 24 until the ridge 26*a* engages with the exhaust seat 32*b*, thus closing the central aperture 32*a* in the main gate 32.

A portion of the housing 24 forming the edges of the main chamber 30 is provided with a ledge 34 which extends around the entire housing 24 into the first sub-chamber 30*a*, and which is provided with a generally circular ridge 34*a* which extends towards the main gate 32. The main gate 32 is movable into engagement with this ridge 34*a*, the portion of the main gate 32 engaging with the ridge 34*a* so as substantially to prevent flow of fluid between the main gate 32 and the housing 24 thus providing a valve seat hereinafter referred to as the reservoir seat 32*c*.

A spring 44 is provided which acts on the main gate 32, pushing the reservoir seat 32*c* against the ledge 34.

When the control piston 26 is engaged with the exhaust seat 32*b*, and the main gate 32 is engaged with the circular ridge 34*a*, an annular chamber 30*a* is formed in the main chamber 30 between the control piston 26 and the main gate 32, and the delivery port 14 is arranged to communicate with the chamber 30a. In other words, the main gate 32 divides the main chamber 30 into two—the annular chamber 30a into which the delivery port 14 opens, and a further chamber 30b into which the supply inlet 12 opens.

In this further chamber 30b is provided a separator 36 which has a generally cylindrical portion 36a which extends from the housing 24 around the exhaust outlet 16 towards the central aperture 32a of the main gate 32. The internal diameter of the cylindrical portion 36a of the separator 36 is similar to the diameter of the central aperture 32a of the main gate 32, and an O-ring 38 is provided between the cylindrical portion 36a of the separator 36 and the main gate 32. The O-ring 38 provides a substantially fluid tight seal between the separator 36 and the main gate 32 which acts to ensure that flow of fluid into the exhaust can only occur via the central aperture 32a in the main gate 32, whilst allowing movement of the main gate 32 into and out of engagement which the ledge 34.

The supply inlet 12 opens into the volume surrounding the cylindrical portion of the separator 36.

Flow of fluid between these apertures is controlled by movement of the control piston 26 and the main gate 32 as follows.

When there is no braking demand, the hold valve 18 is in the closed position, and the exhaust valve 20 is in the open position. The control chamber 22 is therefore vented to atmosphere and the control piston 26 is located such that the volume of the control chamber 22 is minimum. The reservoir seat 32c is engaged with the ledge 34 so that flow of fluid from the supply inlet 12 to the delivery port 14 is prevented, and the exhaust seat 32b is out of engagement with the control piston 26 so that flow of fluid from the delivery port 14 to the exhaust outlet 16 via the central aperture 32a in the main gate 32 is permitted. The delivery port 14, and hence the brake actuator is therefore vented to atmosphere, and no pressure is being applied at the brake.

When a braking demand signal is received, the hold valve 18 is operated so that the valve member 18c moves to the open position, and the exhaust valve 20 is operated so that the valve member 20c moves to the closed position. The control chamber 22 is therefore no longer venting to atmosphere, and flow of fluid from the reservoir into the control chamber 22 causes fluid pressure in the control chamber 22 to increase. The control piston 26 is acted on by this increasing pressure and moves towards the main piston to increase the volume of the control chamber 22. As the control piston moves, it comes into engagement with the exhaust seat 32b on the main gate 32. At this point, the delivery port 14 is no longer connected to the exhaust outlet 16. As the fluid pressure in the control chamber 22 continues to increase, when it reaches a certain point, the force of the fluid pressure in the control chamber 22 acting on the control piston 26 is sufficiently large that the control piston 26 carries on moving to increase the volume of the control chamber 22 and therefore pushes the main gate 32 against the biasing force of the spring 44 so that the reservoir seat 32c moves out of engagement with the ledge 34. At this point, the supply inlet 12 can communicate with the delivery port 14, and flow of fluid from the reservoir to the brake actuator commences. The modulator 10 is said to be in the "build configuration".

It will be appreciated that when the hold valve 18 and the exhaust valve 20 are first operated to bring the modulator 10 from the exhaust configuration to the build configuration, movement of the main gate 32 to open the reservoir seat 32c will not commence until the pressure in the control chamber 22 is such that the force acting on the control piston 26 is sufficient to overcome the frictional forces between the control piston 26 and the housing 24, frictional forces between the main gate 32 and the separator 36, and, most significantly, the "energisation force" of the reservoir seat 32c. The "energisation force" of the reservoir seat 32c is the force pushing the main gate 32 against the ledge 34. The pressure in the control chamber 22 required to open the reservoir seat 32c is known as the "cracking pressure" of the modulator 10.

When the pressure in the brake actuator reaches the required level, and it is desired to hold that pressure, the hold valve 18 is operated to move the valve member 18c to the closed position. The control chamber 22 is therefore closed. As fluid continues to flow from the reservoir and into the modulator 10 via the supply inlet, fluid pressure in the main chamber 30 builds and acts on the control piston 26 against the pressure in the control chamber 22 to cause the control piston 26 to move back to reduce the volume of the control chamber 22. The main gate 32 may then move under the biasing force of the spring until the reservoir seat 32c comes into engagement with the ledge 34. At this point, flow of fluid from the reservoir to the brake actuator is prevented whilst the exhaust outlet remains closed, and the modulator 10 reaches an equilibrium at which the fluid pressure in all parts of the modulator 10 remains constant, and is said to be in the "hold configuration" or "lapped configuration".

To release the brake pressure, the exhaust solenoid 20 is operated to move the valve member 20c to the open position. The fluid in the control chamber 22 is vented to atmosphere, and the fluid pressure in the main chamber 30 of the modulator 10 acts on the control piston 26, pushing it out of engagement with the exhaust seat 32b. Fluid may then flow from the brake actuator into the delivery port 14, through the central aperture 32a of the main gate 32 and be vented to atmosphere via the exhaust outlet 16. The modulator thus returns to the "exhaust configuration".

The present invention relates to an improved configuration of a modulator.

According to a first aspect of the invention we provide a valve assembly having a housing into which are provided a first port, a second port and a third port, and in which are located a first movable member, a second movable member and a third movable member, the first movable member being movable between a first position which causes the second movable member to close the first port to prevent any substantial flow of fluid through the first port, whilst the second and third ports remain open and flow of fluid between the second and third ports is permitted, a second position which causes the third movable member to close the third port to prevent any substantial flow of fluid through the third port, whilst the first and second ports remain open and flow of fluid between the first and second ports is permitted, and a third position which causes the second movable member to close the first port and the third movable member to close the third port to prevent any substantial flow of fluid through either the first port or the third port.

Preferably the second movable member and the third movable member are separate such that relative movement between the second movable member and the third movable member is permitted.

By virtue of this separation of the second and third movable members, the valve assembly may be configured to ensure that forces acting on the second and third movable members to urge them to close their respective port can be optimised without affecting the forces acting on the other of the second or third movable member. This means that, where the valve assembly is used as a modulator in a vehicle braking system, the first port is connected to a supply of pressurised fluid, the second port is connected to a working volume in a fluid pressure operated brake actuator, and the third port vented to atmosphere, the valve can be configured to optimise the force closing the exhaust port when the modulator is in the hold configuration without affecting the cracking pressure.

In one embodiment of the invention, there is a valve formation which surrounds the third port, which is fixed relative to the housing and which is configured such that engagement of the valve formation with a valve seat provided by the third movable member substantially closes the third port. In this case, the third movable member may be provided with a body which engages with a bearing surface of the housing, there being a seal which provides a substantially fluid tight seal between the bearing surface and the body of the third movable member whilst permitting movement of the third movable member relative to the housing. The area enclosed by points of contact of the valve formation with the valve seat is advantageously greater than the area enclosed by the points of contact of the seal with the bearing surface.

In a preferred embodiment of the invention, the first, second and third movable members are separate such that relative movement between them is permitted.

In one embodiment of the invention, the first movable member divides the housing into two chambers, a main chamber and a control chamber, the first, second and third ports being in communication with the main chamber, and a control port being provided in the housing to communicate with the control chamber. Thus, movement of the first movable member may be effected by controlling the flow of fluid into the control chamber via the control port. In this case, at least one electrically operable valve may be provided to control flow of fluid into and out of the control chamber.

A resilient biasing element may be provided between the second movable member and the housing.

A resilient biasing element may be provided between the first movable member and the third movable member. In this case, advantageously there is a further link between the first movable member and the third movable member which comprises a link element which is fixed relative to one of the first movable member or third movable members and a first stop which is fixed relative to the other of the first movable member or third movable member, the link element engaging with the first stop when the separation of the first movable member and the third movable member is at a first predetermined distance to prevent any further decrease in the separation of the first movable member and the third movable member. Where such a first stop is provided, the movable member having the first stop may also be provided with a second stop, the link element engaging with the second stop when the separation of the first movable member and the third movable member is at a second predetermined distance to prevent any further increase in the separation of the first movable member and the third movable member. Preferably the link element is fixed relative to the first movable member whilst each stop is fixed relative to the third movable member.

In one embodiment of the invention, there is a further valve formation, the further valve formation surrounding the first port and being fixed relative to the housing and configured such that engagement of the further valve formation with a valve seat provided by the second movable member substantially closes the first port.

The second movable member may be provided with a through-bore which extends from a portion of the second movable member enclosed by the valve seat and provides a connection between the side of the second movable member provided with the valve seat, and an opposite side of the valve member.

The second movable member is advantageously provided with a locating part which engages with a further bearing surface of the housing, there being a further seal which provides a substantially fluid tight seal between the further bearing surface and the second movable member whilst permitting movement of the second movable member relative to the housing.

Advantageously, the area enclosed by points of contact of the further valve formation with the valve seat provided by the second movable member is substantially equal to the area enclosed by the points of contact between the further seal and the further bearing surface. Configuring the valve assembly in this way ensures that fluid pressure at the first port does not exert a net force on the second movable member when the first port is closed.

In one embodiment of the invention, the first port extends through an aperture in the first movable member towards the second movable member.

In one embodiment of the invention, a portion of the second movable member is surrounded by a portion of the third movable member. In this case, a portion of the locating part of the second movable member is surrounded by a portion of the body of the third movable member.

An embodiment of the invention will now be described with reference to the accompanying drawings of which.

Figure 2:
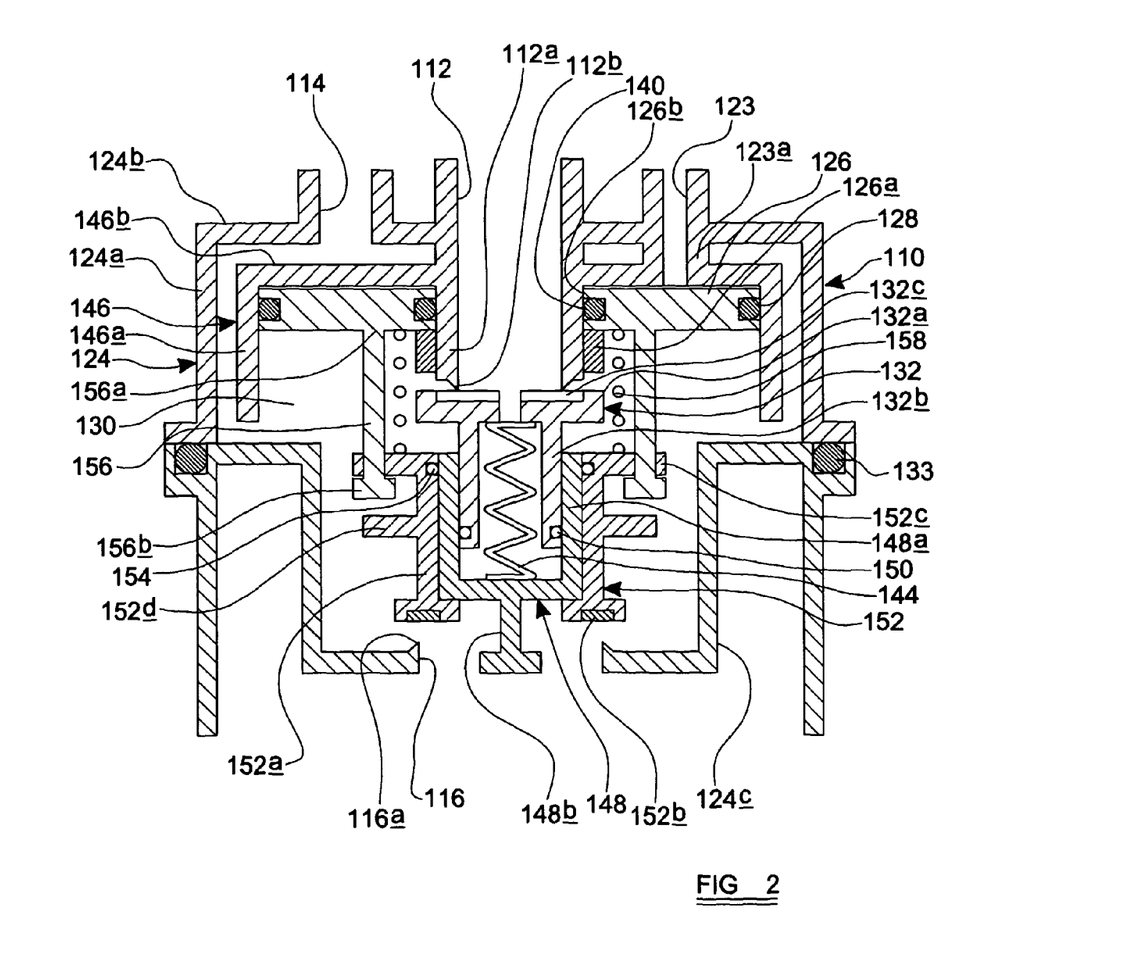
FIG. 2 is a schematic illustration of a valve assembly according to the invention in the exhaust configuration.
Figure 3:
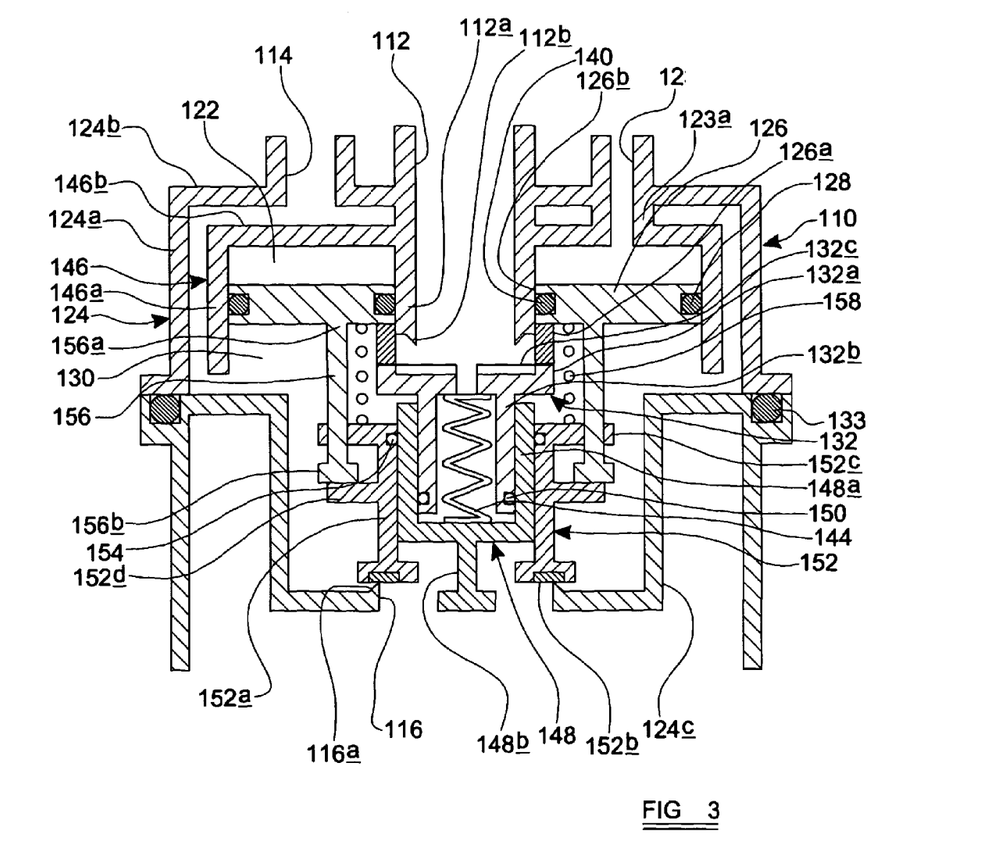
FIG. 3 is a schematic illustration of the valve assembly shown in FIG. 2 in the build configuration.
Figure 4:
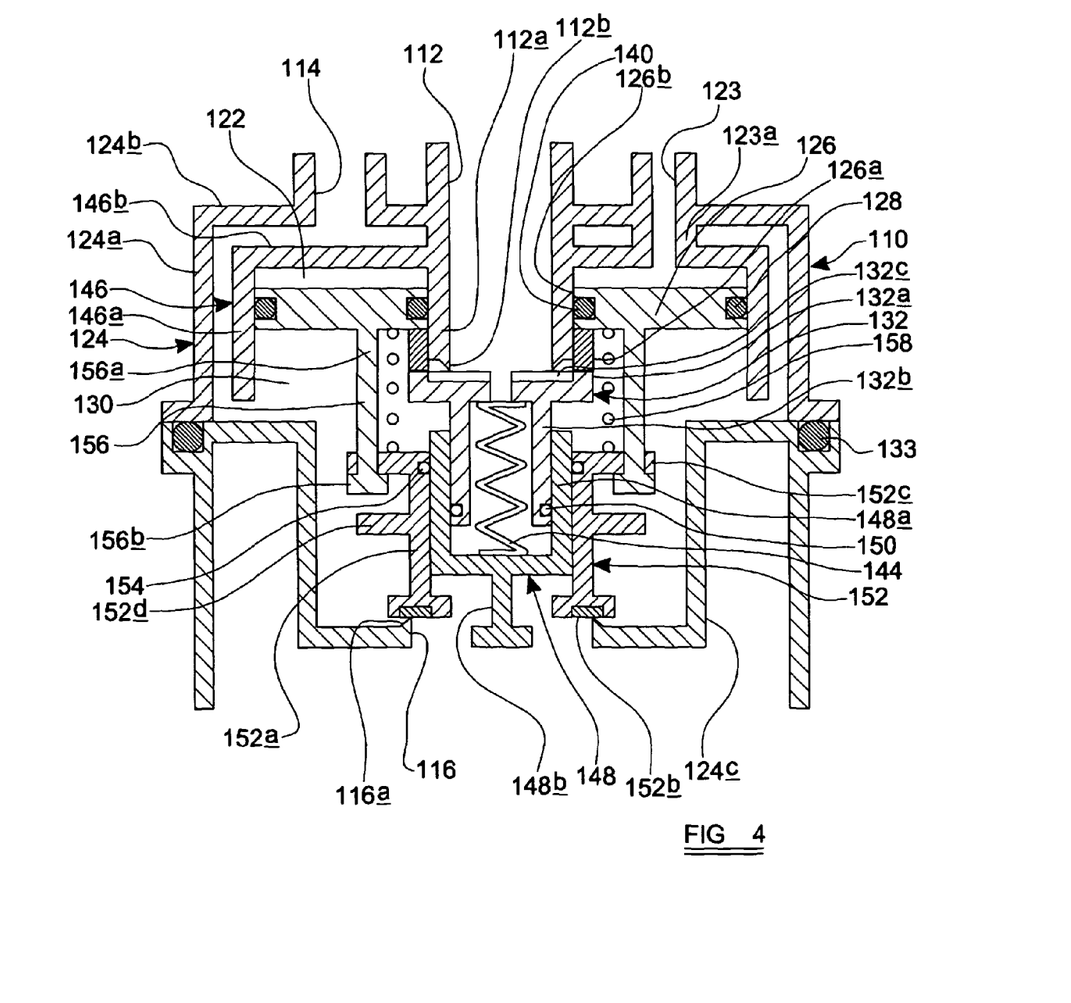
FIG. 4 is a schematic illustration of the valve assembly shown in FIG. 2 in the hold or lapped configuration.

Referring now to FIGS. 2 to 4 there is shown a valve assembly 110, hereinafter referred to as a modulator 110, which is provided with a generally cylindrical housing 124. The housing 124 is provided with a first port, hereinafter referred to as the supply inlet 112, which is adapted to be connected to a source of pressurised fluid, typically a compressed air reservoir (not shown), a second port, hereinafter referred to as the delivery port 114, which is adapted to be connected to a fluid pressure operated brake actuator (not shown), and third port, hereinafter referred to as the exhaust outlet 116, which in this example vents to atmosphere. It will be appreciated that the exhaust outlet need not vent to atmosphere, and may instead be connected to an alternative low pressure volume which may be elsewhere in a vehicle braking system.

The modulator 110 is provided with a first movable member 126, hereinafter referred to as the control piston 126, which is movably mounted in the housing 124. It should be appreciated that the control piston 126 need not be a piston—it could, for example, be a diaphragm. In this example, the control piston 126 divides the housing 124 into two chambers—a control chamber 122 and a main chamber 130. The supply inlet 112, delivery port 114, and exhaust outlet 116 all provide access for fluid to flow into or out of the main chamber 130, whilst a control inlet 123 is provided in the housing 124 to provide fluid flow into or out of the control chamber 122.

In this example, the housing 124 has a generally cylindrical side wall 124a, a generally circular top face 124b which closes a first end of the side wall 124a, and an end cap 124c. In this example, the top face 124b is integral with the side wall 124a, whilst the end cap 124c is a separate component. A sealing element, in this example an O-ring 133, is located between the end cap 124c and the side wall 124a, the sealing element substantially preventing flow of fluid into or out of the housing 124 other than via one of the supply inlet 112, delivery port 114, exhaust outlet 116 or control inlet 123.

The exhaust outlet 116 is an aperture provided in the end cap 124c, whilst the supply inlet 112, delivery port 114, and control inlet 123 are provided in the top face 124b of the housing 124. The main chamber 130 is, however, located between the control piston 126 and the end cap 124c, and therefore, the control chamber 122 is located between the control piston 126 and the supply inlet 112/delivery port 114. As such, in order for the supply inlet 112 to communicate with the main chamber 130 rather than the control chamber 122, a tubular extension 112a extends from around the aperture forming the supply inlet 112 into the control chamber 122, through a generally central aperture 126b provided in the control piston 126, and into the main chamber 130. A free end or valve formation 112b of the tubular extension 112a is therefore located in the main chamber 130. A seal, in this example an O-ring 140, is provided in a groove in the control piston 126 around the aperture 126b, to provide a substantially fluid tight seal between the control piston 126 and the outer diameter of the tubular extension 112a. Thus, movement of the control piston 126 relative to the modulator housing 124 is permitted whilst maintaining separation of the fluid in the control chamber 122 from fluid in the main chamber 130.

Moreover, in this example, in order for the delivery port 114 to communicate with the main chamber 130, the housing 124 is provided with a partition 146 which has a tubular side wall 146a which is enclosed by and generally concentric with the side wall 124a of the housing 124, and a generally circular end cap 146b which closes the end of the side wall 146a adjacent the top face 124b of the housing 124. The side wall 146a and the end cap 146b of the partition 146 are spaced from the side wall 124a and top face 124b of the housing 124 respectively, and fluid flow between the main chamber 130 and the delivery port 114 takes place via this space.

The control piston 126 is located in the generally cylindrical space enclosed by the side wall 146a and end cap 146b of the partition 146. A seal is provided between the control piston 126 and the side wall 146a of the partition 146, which in this example is an O-ring 128 provided in a generally circular groove around the control piston 126. The O-ring 128 engages with the side wall 146a of the partition 146 to provide a substantially fluid tight seal between the control piston 126 and the partition 146. The control chamber 122 is thus enclosed by the control piston 126 and the partition 146. A control tube 123a extends from around the control port 123 in the top face 124b of the housing 124 to an off-centre aperture provided in the end cap 146b of the partition 146, the control tube 123a ensuring that fluid at the control port 123 is directed to the control chamber 122. Furthermore, the tubular extension 112a extends from the supply inlet 112 through a generally central aperture in the end cap 146b of the partition 146 to the control piston 126 and main chamber 130.

Figure 6:
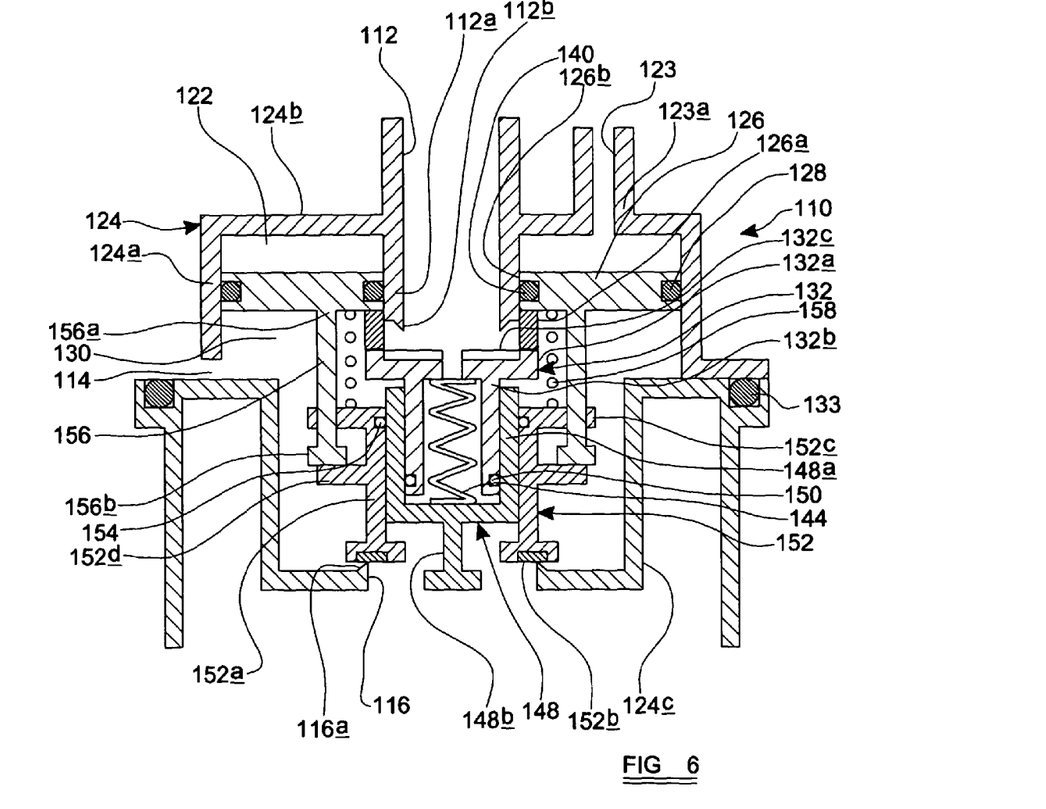
FIG. 6 is a schematic illustration of an alternative embodiment of the valve assembly according to the invention.

It is, however, not necessary to configure the housing 124 in this way, and an alternative embodiment of the invention, which does not include such a partition 146 is illustrated in FIG. 6. In this embodiment of the invention, the control chamber 122 is formed between the top face 124b of the housing 124 and the control piston 126, the O-ring 128 in the control piston 126 engaging with the side wall 124a of the housing 124. The side wall 124a of the housing 124 is provided with an aperture 114 into the main chamber 130, this aperture therefore providing the delivery port 114.

A second movable member 132, hereinafter referred to as the reservoir valve 132, is provided in the main chamber 130. The reservoir valve 132 is provided with a generally circular seat part 132a which is biased into engagement with the free end of the tubular extension 112a surrounding the supply inlet 112, by means of a compression spring, hereinafter referred to as the reservoir spring 144.

The free end 112b of the tubular extension 112a is provided with a valve formation 112b—in this example a generally circular ridge, for engagement with the reservoir valve 132. Moreover, an annular seat insert 132c, in this example made from a resilient rubber material, is provided in the seat part 132a. These assist in providing a fluid tight seal between the seat part 132a and the tubular extension 112a when the two are engaged, thereby closing the supply inlet 112. It will be appreciated, of course, that a resilient seat insert could be provided on the free end 112b of the tubular extension 112a, and the valve formation on the reservoir valve 132.

The reservoir valve 132 also includes a tubular locating part 132b which extends from the seat part 132a towards the end cap 124c of the housing 124. The locating part 132b surrounds a portion of the reservoir spring 144 and extends between the seat part 132a and a supporting part 148 of the end cap 124c. The supporting part 148 is goblet shaped, in that it comprises a cup part 148a which has a generally circular base and sidewall which encloses a generally cylindrical space, and a stem part 148b which extends between the base of the cup part 148a and the end cap 124c.

The stem part 148b of the supporting part 148 is connected to the remainder of the housing 124 by means of (in this example two radially opposing) struts (not shown) which extend from the area of the end cap 124c surrounding the exhaust outlet 116 to the base of the stem part 148b, thus supporting the stem part 148b generally centrally in the exhaust outlet 116, without impending flow of fluid through the exhaust part to any significant degree.

The locating part 132b of the reservoir valve 132 extends into the cup part 148a of the supporting part 148, and has a seal 150 (again, in this example, an O-ring) provided around its outer surface. The O-ring 150 engages with the inner surface of the cup part 148a to provide a substantially fluid tight seal between the reservoir valve 132 and the end cap 124c whilst allowing the reservoir valve 132 to move against the biasing force of the reservoir spring 144 out of engagement with the tubular extension 112a around the supply inlet 112.

So as to prevent fluid pressure at the supply inlet 112 exerting a net force on the reservoir valve 132 tending to push the reservoir valve 132 against the biasing force of the reservoir spring 144 and out of engagement with the tubular extension 112a, the reservoir valve 132 is provided with a throughbore which extends from a generally central portion of the seat part 132a enclosed by the seat insert 132c and connects the supply inlet 112 with the volume enclosed by the locating part 132b and the cup part 148a of the supporting part 148. Two sides of the reservoir valve 132 are therefore exposed to the fluid at the supply inlet 112—the uppermost side of the seat part 132a and the lowermost side of the seat part 132a and locating part 132b.

Moreover, the diameter of the valve formation 112b is substantially equal to the inner diameter of the cup part 148a of the supporting part 148. As such the area enclosed by the points of contact between the valve formation 112b and the seat insert 132c and the area enclosed by the points of contact between the O-ring 150 and the supporting part 148 are substantially equal. This ensures that, when the reservoir valve 132 is engaged with the tubular extension 112a, the two sides of the reservoir valve 132 exposed to the supply inlet fluid pressure are equal in area, and the supply inlet fluid pressure exerts no net force on the reservoir valve 132.

The control piston 126 is provided with a plurality of castellations 126a which are spaced around the generally central aperture 126b and extends towards the reservoir valve 132. It will be appreciated that engagement of the castellations 126a with the reservoir valve 132 sets a minimum spacing between the control piston 126 and the reservoir valve 132.

The modulator 10 is also provided with a third movable member 152, hereinafter referred to as the exhaust valve 152. The exhaust valve 152 has a tubular body 152a which surrounds the cup part 148a of the supporting part 148. A seal 154, in this example an O-ring, is located in a groove around the radially inward facing surface of the tubular body 152a, and provides a substantially fluid tight seal between the exhaust valve 152 and the outer surface of the cup part 148a of the supporting part 148, whilst allowing the exhaust valve 152 to slide longitudinally relative to the supporting part 148.

At the end of the tubular body 152a adjacent the end cap 124c, there is provided a radially outwardly and inwardly extending flange part which provides support for an exhaust seat insert 152b. Preferably, the exhaust seat insert 152b is made from a resilient material such as rubber. The exhaust valve 152 is movable relative to the housing 124 to bring the exhaust seat insert 152b into and out of engagement with a valve formation, which comprises a generally circular ridge or valve formation 116a which extends into the main chamber 130 from the portion of the end cap 124c surrounding the exhaust outlet 116. Engagement of the exhaust valve 152 with the end cap 124c in this way substantially prevents flow of fluid through the exhaust outlet 116. It will be appreciated, of course, that a resilient seat insert may be provided on the end cap 124c of the housing 124 around the exhaust outlet 116, and the valve formation on the exhaust valve 152.

A mechanical link is provided between the control piston 126 and the exhaust valve 152. In this example, the link comprises a plurality of connecting rods 156 which extend from the control piston 126 into the main chamber 130 to the exhaust valve 152.

The other end of the tubular body 152a of the exhaust valve 152, i.e. the end adjacent the control piston 126, is provided with a radially outwardly extending connection flange 152c. A series of apertures are provided in this connection flange 152c, generally equally spaced around the circumference of the tubular body 152a. Through each of these apertures extends a connecting rod 156. Each connecting rod 156 has a first end 156a which is secured to the control piston 126, and a second end which is provided with a stop part 156b which extends generally perpendicular to the longitudinal axis of the connecting rod 156. It will be appreciated that, to simplify manufacture of the modulator 110, the connecting rods 156 cannot be integral with the control piston 126, and advantageously either the connecting rods 156 are screwed into the control piston, or the stop part 156b is screwed onto the connecting rods 156.

The exhaust valve 152 is also provided with a stop part 152d which comprises a flange which extends radially outwardly from the tubular body 152a and which is located between the exhaust seat insert 152b and the connection flange 152c. The connecting rods 156 can slide in the apertures, and therefore movement of the control piston 126 relative to the exhaust valve 152 is permitted, but it will be appreciated that engagement of the stop parts 156b of the connecting rods 156 with the flange part 152c sets a maximum spacing between the control piston 126 and the exhaust valve 152, and engagement of the stop parts 156b of the connecting rods 156 with the stop part 152d of the exhaust valve 152 sets a minimum spacing between the control piston 126 and the exhaust valve 152.

Figure 5:
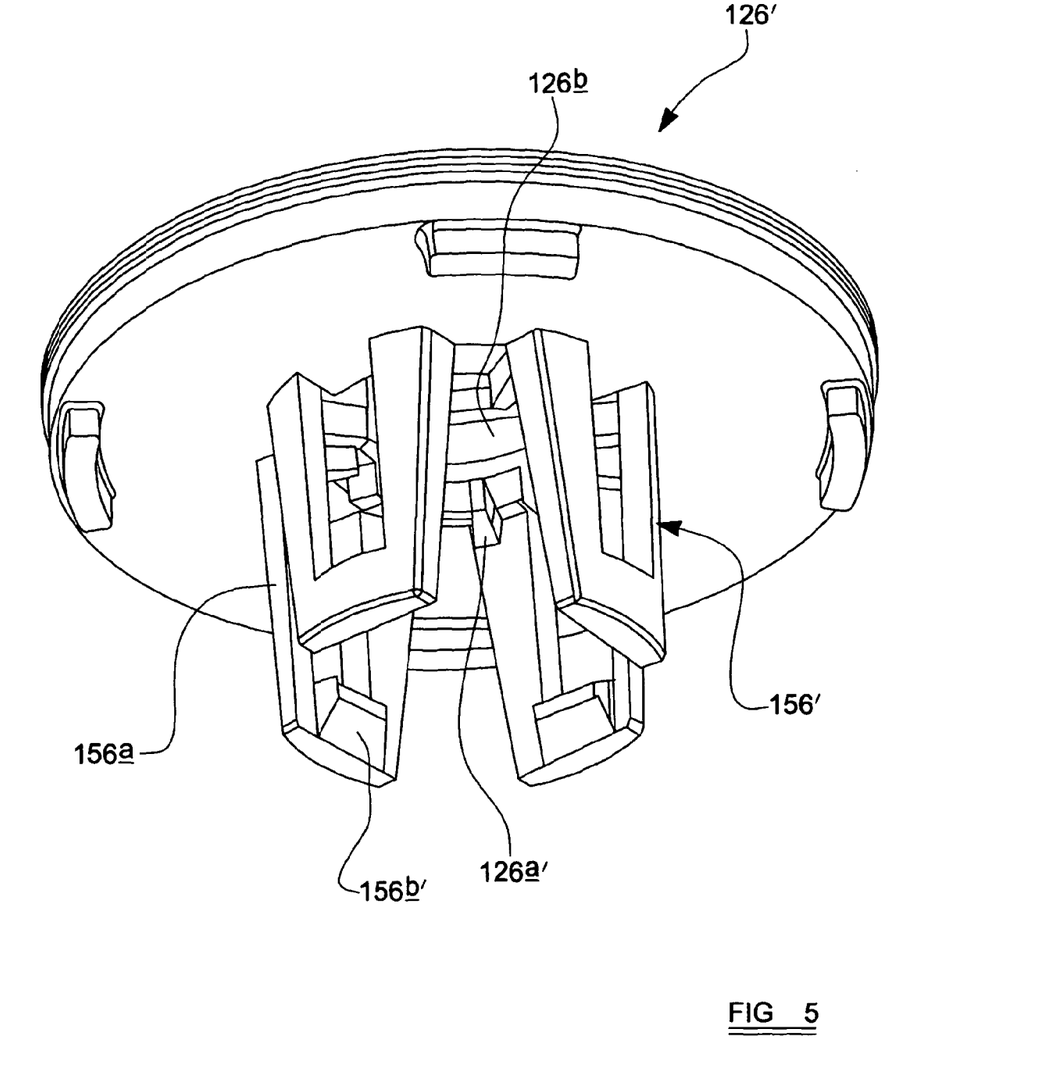
FIG. 5 is a perspective view of an alternative configuration of a control piston suitable for use in a modulator according to the invention.

An alternative configuration of this link is illustrated in FIG. 5, which shows a perspective view of an alternative embodiment of control piston 126' from the main chamber side of the piston. In this version, the link is provided by four U-shaped legs 156', the base part of which is provided with a radially inwardly extending lip formation 156b'. In this case, the connection flange 152c of the exhaust valve 152 is not provided with a series of apertures, and the legs 156' lie radially outwardly of the connection flange 152c with the lip formation 156b' extending into the space between the connection flange 152c and the stop part 152d. Advantageously, the legs 156' are sufficiently flexible and resilient that, during assembly of the modulator 110, the legs 156' may be bent slightly to force the lip formations 156b' over the connection flange 152c until the lip formation 156b' snaps into place in the space between the connection flange 152c and the stop part 152d.

Figure 7:
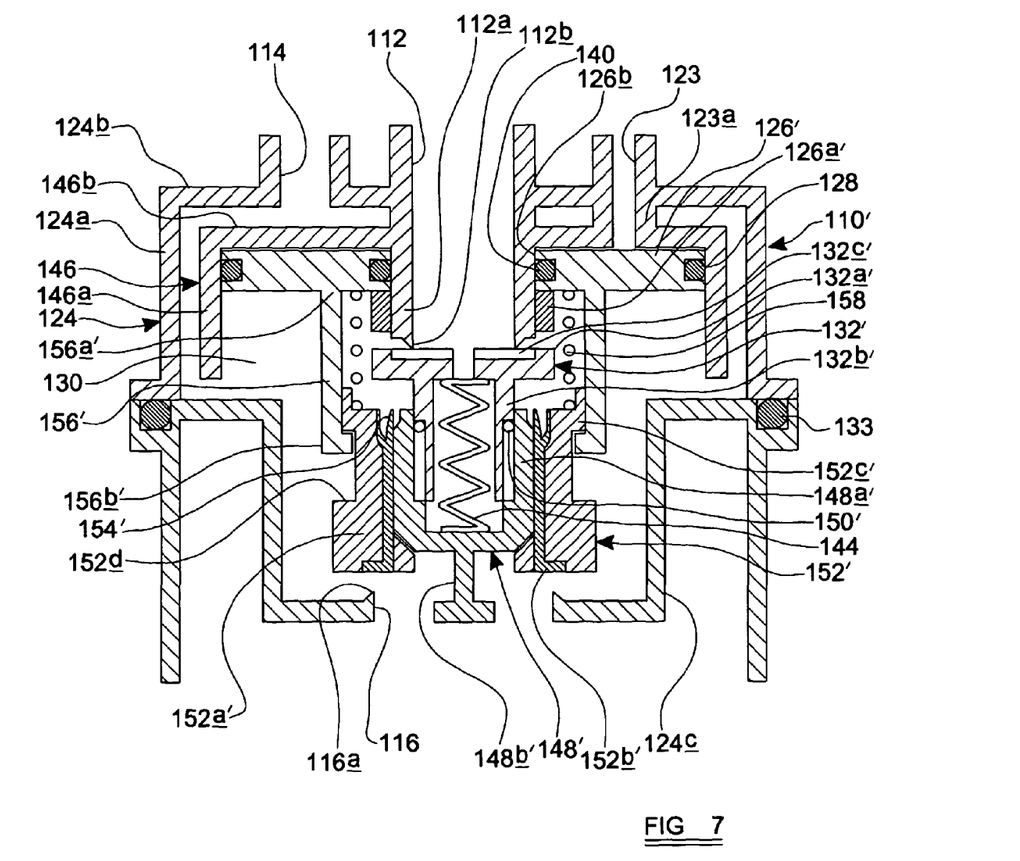
FIG. 7 is a schematic illustration of a further alternative embodiment of the valve assembly according to the invention in the exhaust configuration.
Figure 8:
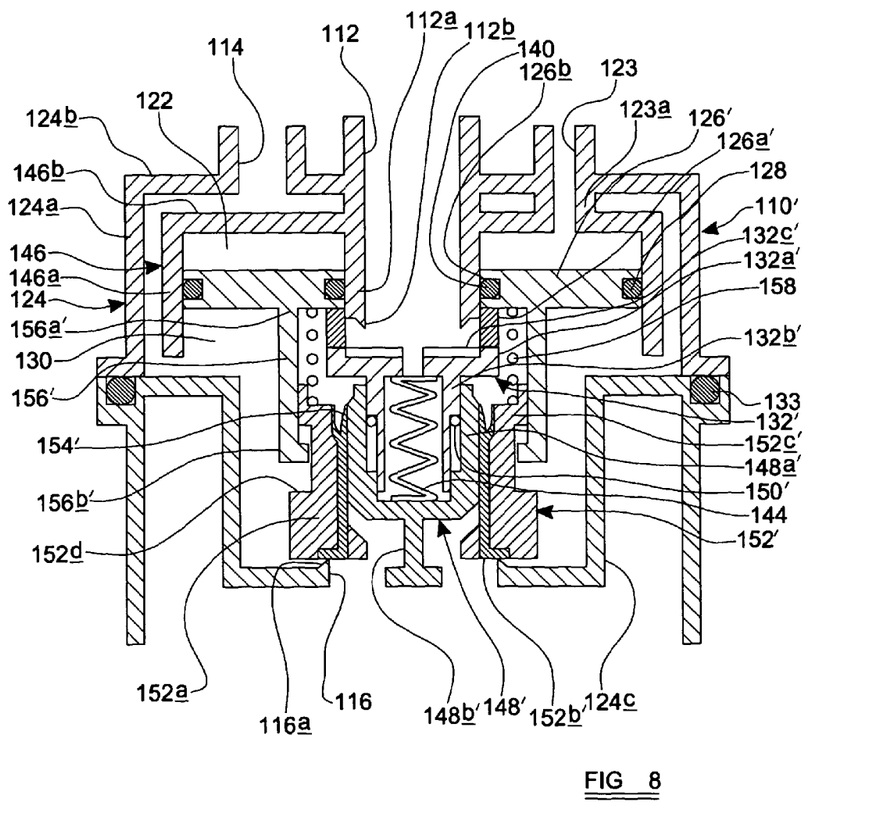
FIG. 8 is a schematic illustration of a further alternative embodiment of the valve assembly according to the invention in a build configuration.

An example of an alternative configuration of modulator 110' including the alternative configuration of control piston 126' illustrated in FIGS. 5 is shown in FIGS. 7-8. This is identical to the embodiment shown in FIGS. 2-4 except for the elements described explicitly below.

The configuration of the exhaust valve 152' differs slightly in that the connection flange 152c' does not have a series of apertures and the stop part 152d' is provided by a shoulder between a larger outer diameter end portion of the body 152a' and a smaller diameter central portion. The lip formations 156b' of the control piston 156' extend radially inwardly towards the central portion of the exhaust valve 152' between the connection flange 152c' and the larger outer diameter end portion of the body 152a'

The configuration of the seal 154' between the tubular body 152a' of the exhaust valve 152' and the outer surface of the cup part 148a is also different as the O-ring used in the embodiment shown in FIGS. 2-4 is replaced by a generally U-shaped lip seal 154'. In this example, the lip seal 154' is made of rubber or similar elastomeric material as is integral with the exhaust seat insert 152b', but this need not be the case, and these two parts could be separate from one another.

The radially outward surface of the cup part 148a' is shaped to provide a tapered portion in which its outer diameter increases from a reduced outer diameter portion at its free end to a maximum outer diameter portion. When the modulator 110' is in the exhaust configuration as illustrated in FIG. 7, the lip seal 154' is spaced from the reduced outer diameter portion of the cup part 148a' so that no seal is provided between the exhaust valve 152' and the support part 148. This does not cause any unwanted leakage of fluid from the modulator 110', however, as the supply port 112 is closed by the reservoir valve 132. As the control piston 126' moves to open the supply port 112, the exhaust valve 152' moves towards the exhaust seal 116a, and one of the arms of the lip seal 154' comes into engagement with the maximum outer diameter portion of the cup part 148a'. This engagement of the lip seal 154' with the cup part 148a' provides a substantially fluid tight seal, so that when the supply port 112 is opened, fluid cannot leak from the supply port 112 to the exhaust port 116 via the space between the cup part 148a' and the exhaust valve 152'.

This sealing arrangement has an advantage that the seal does not come into play until it is actually needed, i.e. when the supply port 112 is about to be opened. Before then, it is not active, and frictional forces between the exhaust valve 152' and the support part 148 are minimised as the exhaust valve 152' commences moving towards closing the exhaust port 116.

In this embodiment of the invention the seal 150' between the reservoir valve 132 and the cup part 148a' is also provided by a ring seal, but rather than being provided in a circumferential groove in the outermost surface of the locating part 132b of the reservoir valve 132, it is lodged in the annular space between a reduced outer diameter portion of the locating part 132b' and an increased inner diameter portion of the cup part 148a'.

It should be appreciated that these differences are not interdependent so each may be included separately in a further embodiment of modulator according to the invention. Moreover, each or all of these features may be included in the configuration of modulator illustrated in FIG. 6.

It should also be appreciated that, whilst in these embodiments of the invention, the link between the control piston 126, 126' and the exhaust valve 152, 152' comprises a longitudinal element—the connecting rods 156 or legs 156', which are fixed to the control piston 126, 126', and radially outwardly extending flanges which are provided on the exhaust valve and form the stops 152c, 152c' and 152d, 152d', or the longitudinal link element may be provided on the exhaust valve 152, 152', with the stops on the control piston 126, 126'.

The diameter of the valve formation 116a surrounding the exhaust outlet 116 which engages with the exhaust seat insert 152b, 152b' is deliberately selected to be greater than the diameter of the cylindrical space enclosed by the tubular body 152a, 152a'' of the exhaust valve 152, 152'. This means that, the area enclosed by the points of contact between the exhaust valve formation 116a and the exhaust seat insert 152b, 152b' is greater than the area enclosed by the points of contact between the O-ring 154 or lip seal 154' and the cup part 148a, 148a' of the supporting part 148, 148'. As such, when the exhaust valve 152, 152' is engaged with this ridge, the fluid pressure in the main chamber 130 exerts a net force on the exhaust valve 152, 152' which pushes the exhaust valve 152, 152' into engagement with the exhaust valve formation 116a.

In a preferred embodiment of the invention, the difference in diameter is selected so that the force pushing the exhaust valve 152, 152' into engagement with the end cap 124c of the housing 124 (i.e. the exhaust seat energisation) is 1 N/mm when the pressure in the main chamber is 10 bar. It will be appreciated, however, that this difference can be tailored to give whatever seat energisation is required—either higher or lower, without having any effect on the cracking pressure of the modulator 110. In contrast, this is not possible to do in the prior art modulator 10 discussed above, as changing the exhaust seat energisation can only be achieved by altering the strength of the spring 44, and this will inevitably effect the cracking pressure of the modulator 10.

A spring 158 is provided between the control piston 126, 126' and the exhaust valve 152, 152'. This spring, hereinafter referred to as the exhaust spring 158, is, in this example, a helical compression spring, extends from the control piston 126, 126' to the connection flange 152c, 152c' of the exhaust valve 152, 152', and is located radially inwardly of the connecting rods 156 or legs 156', around the tubular extension 112a and a portion of the reservoir valve 132, 132'.

Flow of fluid between the supply inlet 112, the delivery port 114 and the exhaust port 116 is controlled by movement of the control piston 126, 126' in a very similar way to in the prior art modulator 10. In this example, a conventional electrically operated valve assembly, comprising a hold valve and exhaust valve just as in the prior art arrangement described above, is provided to control flow of pressurised fluid into the control chamber 122 via the control inlet 123. The hold and exhaust valves have been omitted from FIGS. 2-4 for clarity. The modulator 110, 110' operates as follows.

When there is no braking demand, the modulator 110, 110' adopts the exhaust configuration as illustrated in FIGS. 2 and 7. The exhaust and hold valves are operated as described above to vent the control chamber 122 to atmosphere, and the control piston 126, 126' is located such that the volume of the control chamber 122 is at a minimum. The reservoir seat part 132a, 132a' is engaged with the tubular extension 112a of the supply inlet 112 so that flow of fluid from the supply inlet 112 into the main chamber 130 is substantially prevented, and the exhaust seat insert 152b, 152b' is spaced from the end cap 124c of the housing 124 such that flow of fluid from the delivery port 114 to the exhaust outlet 116 is permitted.

When a braking demand signal is received, the hold and exhaust valves are operated as described above to direct pressurised fluid to the control chamber 122 via the control port 123 and control tube 123a. The control piston 126, 126' is acted on by the increasing pressure in the control chamber 122 and is pushed towards the reservoir valve 132' and the exhaust valve 152'. The force from the pressure in the control chamber 122 is transmitted to the exhaust valve 152 via the exhaust spring 158, and as the control piston 126, 126' moves to increase the volume of the control chamber 122, the exhaust valve 152, 152' moves with it, until the exhaust seat insert 152b engages with the ridge around the exhaust outlet 116. Fluid flow through the exhaust outlet is thus substantially prevented.

As the pressure in the control chamber 122 increases further, the exhaust spring 158 is compressed as the control piston 126, 126' continues to move to further increase the volume of the control chamber 122. The castellations 126a, 126a' on the control piston 126, 126' then engage with the reservoir valve 132, 132' and push the reservoir seat part 132a, 132a' out of engagement with the tubular extension 112a, so that flow of fluid through the supply inlet 112 to the main chamber 130 and then to the delivery port 114 is permitted. The stop parts 156b, 156b' on the connecting rods 156 or legs 156' then engage with the stop part 152d, 152d' on the exhaust valve 152, 152' to bring movement of the control piston 126, 126' to a stop. The modulator 110, 110' is then in the build configuration as illustrated in FIGS. 3 and 8.

It will be appreciated that the height of the castellations 126a, 126a' is selected to ensure that the exhaust valve 152, 152' is engaged with the end cap 124c of the housing 124, thus closing the exhaust outlet 116, before the castellations 126a, 126a' engage with the reservoir valve 132, 132'. If this was not the case, the supply inlet 112 and the exhaust port 116 would be open at the same time, which would result in venting of the pressurised fluid supply to the atmosphere. Similarly, it will be appreciated that the separation of the stop part 152d, 152d' and connection flange 152c, 152c' of the exhaust valve 152, 152' is selected such that the stop parts 156b, 156b' of the connecting rods 156 or legs 156' do not engage with the stop part 152*d*, 152*d'* of the exhaust valve 152, 152' until the control piston 126, 126' has pushed the reservoir valve 132, 132' far enough away from the tubular extension 112*a* to ensure substantially unimpeded flow of fluid through the supply inlet 112.

If the exhaust valve 152, 152' should stick so that, as the pressure in the control chamber 122 builds, it doesn't move, and, instead, the exhaust spring 158 is compressed, it is possible that the castellations 126*a*, 126*a'* could engage with the reservoir valve 132, 132' to open the supply inlet 112 whilst the exhaust outlet 116 is still open. The stop part 152*d*, 152*d'* on the exhaust valve 152, 152' mitigates this problem, because, as the exhaust spring 158 is compressed, the stop parts 156*b*, 156*b'* of the connecting rods 156 or legs 156' engage with the stop part 152*d*, 152*d'* of the exhaust valve 152, 152' when the supply inlet 112 is partially open. This either forces the exhaust valve 152, 152' to move to close the exhaust outlet 116, or prevents further movement of the control piston 126, 126' and the supply inlet 112 being fully opened.

Use of the configuration of seal 154' illustrated in FIGS. 7-8 may also reduce the risk of the supply inlet 112 being opened at the same time as the exhaust port 116 since this configuration of seal 154' reduces frictional forces between the exhaust valve 152' and the support part 148' as the exhaust valve 152' starts its movement to close the exhaust port 116. This may assist in reducing the likelihood of the exhaust valve 152' sticking as described above.

In order to move the modulator 110 to the hold configuration illustrated in FIG. 4, in which both the exhaust outlet 116 and the supply inlet 112 are closed, the hold and exhaust valves are operated as described above such that flow of pressurised fluid into the control chamber 122 is stopped, and the control chamber 122 is closed. As fluid continues to flow through the supply inlet 112 to the delivery outlet 114, fluid pressure in the main chamber 130 increases, and acts on the control piston 126, 126' pushing it to reduce the volume of the control chamber 122. The reservoir valve 132, 132' is therefore free to move towards the control piston 126, 126' under the action of the reservoir spring 144, until the reservoir seat part 132*c* engages with the tubular extension 112*a* to close the supply inlet 112 again. As this stops the flow of pressurised fluid into the main chamber 130, movement of the control piston 126, 126' stops at an equilibrium position when the force exerted on the control piston 126, 126' by fluid pressure in the control chamber 122 balances the force exerted by fluid pressure in the main chamber 130.

The modulator 110, 110' is returned to the exhaust configuration by venting the control chamber 122 to atmosphere. The control piston 126, 126' is then able to move under the influence of the fluid pressure in the main chamber 130 to minimise the volume of the control chamber 122, and engagement of the stop parts 156*b*, 156*b'* of the connecting rods 156 or legs 156' with the connection flange 152*c*, 152*c'* of the exhaust valve 152, 152' causes the exhaust valve 152, 152' to be pulled out of engagement with the end cap 124*c* of the housing 124, and therefore the exhaust port 116 opened.

This configuration of modulator 110, 110' is particularly advantageous when operated in this way because, unlike in the prior art modulator, all the surface area of the control piston 126, 126' exposed to fluid pressure in the control chamber 122 has an exactly equivalent surface area exposed to fluid pressure in the main chamber 130. This means that (ignoring frictional forces) there is zero net force on the control piston 126, 126' when the pressure in the control chamber 122 is equal to the pressure in the main chamber 130. Frictional forces in the modulator give rise to a slight off-set between the control pressure and the delivery pressure. Broadly speaking, however there is a roughly one to one relationship between control pressure and delivery pressure over all control pressures. In the prior art arrangement described above, this one to one relationship is only present at one control pressure.

It should be appreciated, however, that the valve assembly need not be fluid pressure operated, and the control piston 126, 126' may be moved by mechanical means, for example by means of a mechanical connection to a vehicle brake pedal.

It should also be appreciated that the seals used in the modulator 110, 110' need not be O-rings, and instead of having a generally circular cross-section, may be X or Z-shaped in cross-section, or may comprise a lip seal or any other suitable sealing means which allows relative movement of the two parts in question, whilst providing a seal between the two parts.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A valve assembly having a housing into which are provided a first port, a second port and a third port, and in which are located a first movable member, a second movable member and a third movable member, the first movable member being movable between a first position which causes the second movable member to close the first port to prevent any substantial flow of fluid through the first port, whilst the second and third ports remain open and flow of fluid between the second and third ports is permitted, a second position which causes the third movable member to close the third port to prevent any substantial flow of fluid through the third port, whilst the first and second ports remain open and flow of fluid between the first and second port is permitted, and a third position which causes the second movable member to close the first port and the third movable member to close the third port to prevent any substantial flow of fluid through either the first port or the third port, wherein the second movable member and the third movable member are separate such that relative movement between the second movable member and the third movable member is permitted;

wherein there is a valve formation which surrounds the third port, which is fixed relative to the housing and which is configured such that engagement of the valve formation with a valve seat provided by the third movable member substantially closes the third port;

wherein the third movable member is provided with a body which engages with a bearing surface of the housing, there being a seal which provides a substantially fluid tight seal between the bearing surface and the body of the third movable member whilst permitting movement of the third movable member relative to the housing; and wherein, when the valve formation engages with the valve seat so that the third moveable member substantially closes the third port, the area enclosed by the points of contact of the valve formation with the valve seat is greater than the area enclosed by the points of contact of the seal with the bearing surface, whereby the fluid pressure from the second port acts upon the third moveable member, thereby retaining the third moveable member in the closed position.

2. The valve assembly according to claim 1, wherein the first, second and third movable members are separate such that relative movement between them is permitted.

3. The valve assembly according to claim 1, wherein the first movable member divides the housing into two chambers, a main chamber and a control chamber, the first, second and third ports being in communication with the main chamber, and a control port being provided in the housing to communicate with the control chamber.

4. The valve assembly according to claim 3, wherein at least one electrically operable valve is provided to control flow of fluid into and out of the control chamber.

5. The valve assembly according to claim 1, wherein a resilient biasing element is provided between the second movable member and the housing.

6. The valve assembly according to claim 1, wherein a resilient biasing element is provided between the first movable member and the third movable member.

7. The valve assembly according to claim 6, wherein there is a further link between the first movable member and the third movable member which comprises a link element which is fixed relative to one of the first movable member or third movable members and a first stop which is fixed relative to the other of the first movable member or third movable member, the link element engaging with the first stop when the separation of the first movable member and the third movable member is at a first predetermined distance to prevent any further decrease in the separation of the first movable member and third movable member.

8. The valve assembly according to claim 7, wherein the movable member having the first stop is also provided with a second stop, the link element engaging with the second stop when the separation of the first movable member and the third movable member is at a second predetermined distance to prevent any further increase in the separation of the first movable member and the third movable member.

9. The valve assembly according to claim 7, wherein the link element is fixed relative to the first movable member whilst each stop is fixed relative to the third movable member.

10. The valve assembly according to claim 1, wherein there is a further valve formation, the further valve formation surrounding the first port and being fixed relative to the housing and configured such that engagement of the further valve formation with a valve seat provided by the second movable member substantially closes the first port.

11. The valve assembly according to claim 1, wherein the second movable member is provided with a through-bore which extends from a portion of the second movable member enclosed by the valve seat and provides a connection between the side of the second movable member provided with the valve seat, and an opposite side of the valve member.

12. The valve assembly according to claim 11, wherein the second movable member is provided with a locating part which engages with a further bearing surface of the housing, there being a further seal which provides a substantially fluid tight seal between the further bearing surface and the second movable member whilst permitting movement of the second moveable member relative to the housing.

13. The vale assembly according to claim 12, wherein the area enclosed by points of contact of the further valve formation with the valve seat provided by the second movable member is substantially equal to the area enclosed by the points of contact between the further seal and the further bearing surface.

14. The valve assembly according to claim 1, wherein the first port extends through an aperture in the first movable member towards the second movable member.

15. The valve assembly according to claim 1, wherein a portion of the second movable member is surrounded by a portion of the third movable member.

16. The valve assembly according to claim 1, wherein a portion of the locating part of the second movable member is surrounded by a portion of the body of the third movable member.

17. The valve assembly according to claim 1, wherein the valve formation and the valve seat are configured such that the valve-formation is spaced from the valve seat when the valve assembly is in the first position, and move relative to one another so that the valve formation engages with the valve seat to provide the substantially fluid tight seal as the valve assembly moves toward the second position.

* * * * *